United States Patent [19]
Nebolsine et al.

[11] 3,746,172
[45] July 17, 1973

[54] SELECTIVE MULTI-STAGE FILTRATION SYSTEM

[76] Inventors: Ross Nebolsine, 64 E. 86th St., New York, N.Y. 10028; Guillermo San Roman, 98-50 63d Drive, Rego Park, N.Y. 11374

[22] Filed: Sept. 22, 1970

[21] Appl. No.: 74,246

[52] U.S. Cl. .............................. 210/253, 210/335
[51] Int. Cl. ............................................. B01d 35/12
[58] Field of Search.................... 210/252, 253, 254, 210/335, 334, 340, 341, 332, 333

[56] References Cited
UNITED STATES PATENTS
866,433   9/1907   Clark ............................. 210/254 X Primary Examiner—Frank A. Spear, Jr.
Attorney—W. Lee Helms

[57] ABSTRACT

The apparatus forming the embodiment of the system, eliminates the necessity and disadvantage of a deep-bed filter of large single capacity, and provides greatly improved performance by the provision of a plurality of inter-connected filter units, and controls therefor, each filter unit being so arranged in the system as to be adapted to use one or more filter media and to be operated at its own rate and have its own back-wash cycle, and which can receive its own dosage of chemicals or poly-electrolyte, the apparatus constituting an integrated sequential controlled system.

3 Claims, 2 Drawing Figures

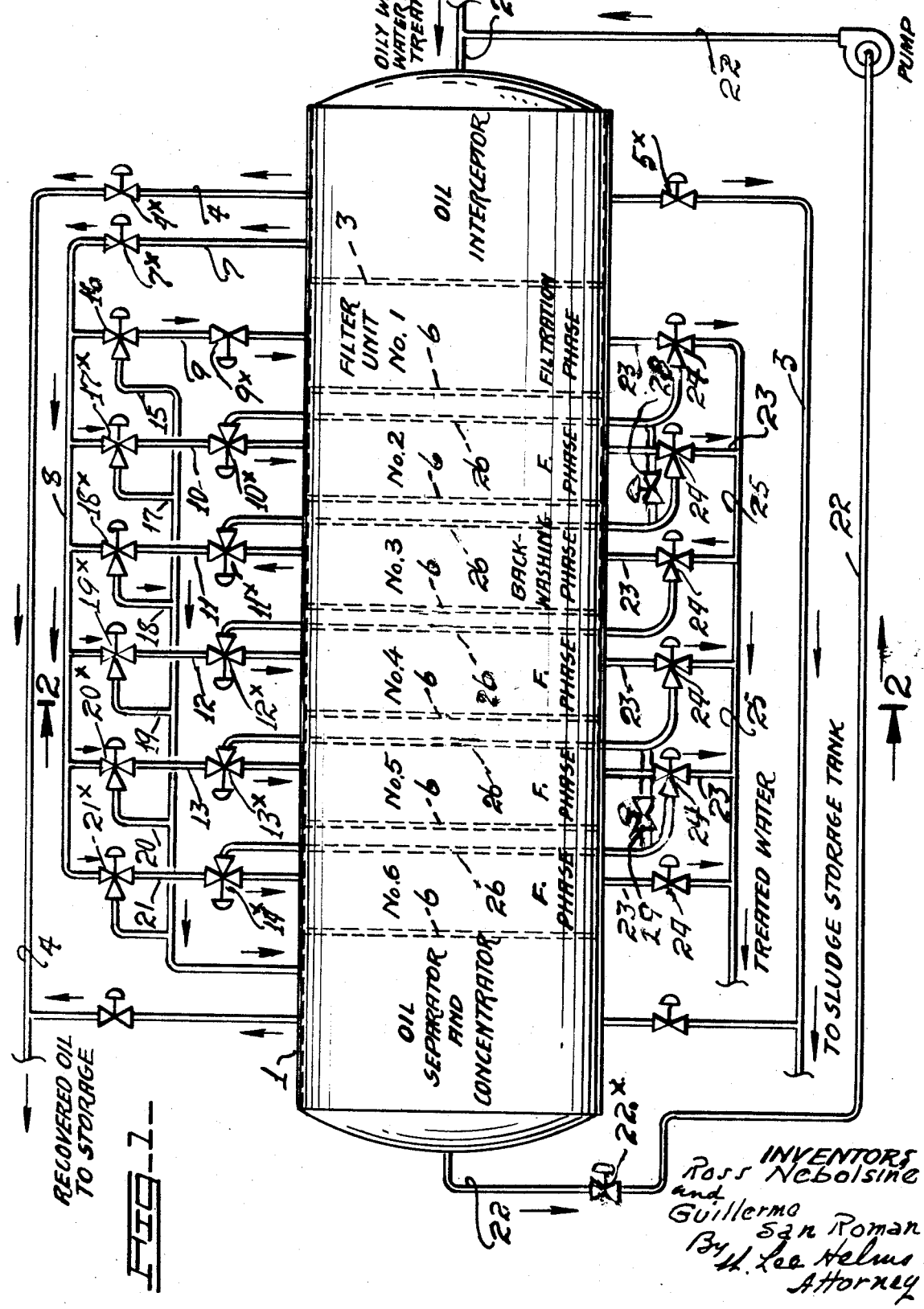

Patented July 17, 1973
3,746,172
2 Sheets-Sheet 2
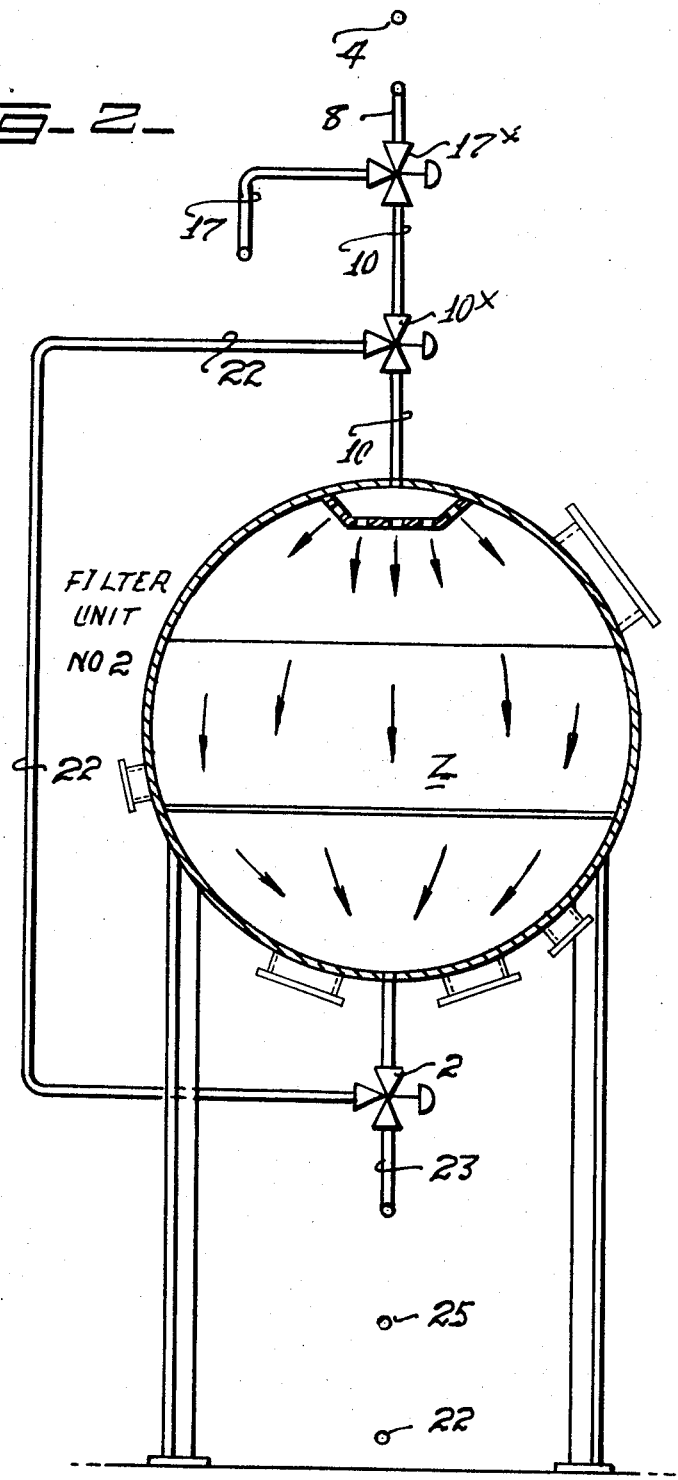

SELECTIVE MULTI-STAGE FILTRATION SYSTEM

The invention will be described with reference to the accompanying drawings, in which:

FIG. 1 is a side elevation of an embodiment of the apparatus particularly adaptable as an oil treatment system, constructed as an elongate tank-like body internally separated into filter units by walls indicated by dotted lines, and with controlling valves and flowpipes controlled thereby.

FIG. 2 is a vertical sectional view through one of the filter units.

Referring to the drawings, it will be seen that the embodiment shown in FIG. 1 comprises an elongated tank-like body 1 adapted to receive fluid, such, for example, as oily waste water to be treated, via pipe 2, and the flow may be by pump or by gravity. The oily waste water, or other fluid, enters an initial unit constituting an oil separator, as indicated, and which is separated from the succeeding units by a wall indicated at 3. These units are shown as filter units No. 1 to No. 6 inclusive, terminating in an oil separator and concentrator.

The interceptor, when the apparatus is used for treating oily fluid, is at its top connected to an oil outflow pipe 4, controlled by valve $4^x$ for flow of recovered oil directly to storage if desired. The interceptor also is provided with a discharge pipe at its base, controlled by valve $5^x$, for passage of sludge to discharge, as to a sludge storage tank. After a dwell period of the fluid in the interceptor the light fluid, such as oil, will rise to the top and hence can be drawn off, or may be further treated of itself or as a content of water and waste material, as hereinafter explained.

The body of each filter unit is separated from the other units by the walls indicated at 6, and a final wall $6^x$ separates unit No. 6 from the separator and concentrator. The interceptor communicates, by controlled means, with each one of the filter units. Outflow pipe 7, controlled by valve $7^x$ communicates with a manifold 8 with branch pipes 9, controlled by valve $9^x$ and leading to filter unit No. 1. Branch pipe 10, with valve $10^x$ leads to filter unit No. 2. Branch pipe 11, with valve $11^x$ leads to filter unit No. 3. Branch pipe 12 leads to filter unit No. 4. Branch pipe 13, with valve $13^x$, leads to filter unit No. 5. Branch pipe 14 leads to filter unit 6.

From filter unit No. 1 a manifold 15 communicates with the separator and concentrator, and said manifold 15 has branch pipe 17 with control valve $17^x$ leading to filter unit No. 2. Branch pipe 18 with control valve $18^x$ leads to filter unit No. 3; branch pipe 19 with control valve $19^x$ leads to filter unit No. 4; branch pipe 20 with control valve $20^x$ leads to filter unit No. 5; and finally branch pipe 21 with control valve $21^x$ leads to filter unit No. 6.

Above its bottom area carrying the relatively heavier sludge, the separator and concentrator communicates with a pipe 22, controlled by a valve $22^x$ by which the lighter fluid, still heavier than the floating light fluid, may be led back to the interceptor for further treatment.

By means of valve $4^x$, the light fluid may be taken off from the interceptor, through pipe 4, to storage.

Selectively, the filter units, or any plurality thereof, may receive treatment material other than, or in addition to, filtering material. For example, if the fluid under treatment is acidic, acid-neutralizing material may be contained in one or more of the filter units, as for example one or more terminating the line of filter units.

All of the valves specified are 3-way valves, that is to say valves $10^x$ to $14^x$ inclusive and valves 16, $17^x$ to $21^x$ inclusive, whereas valves $4^x$, $7^x$ and $9^x$ may be normal valves. Upon opening valve $7^x$ the fluid from the interceptor will flow through pipe 7 to manifold 8, valves 16 and $9^x$ being open the fluid will pass into filter unit No. 1, thence from pipe 23, its valve being open, into filter unit No. 2 via its appropriate feed pipe 10, and so on. Thus by regulation of the valves controlling the filter units No. 3 to No. 6 inclusive, the flow of fluid from the filter units Nos. 1 and 2 will continue through filter units No. 3 to No. 6, inclusive.

Any one or a plurality of the filter units may be brought into special communication with the fluid to be treated. Thus in one arrangement of the valves, the flow from filter No. 1 may pass to filter No. 2 and the latter may discharge directly into pipe 25. Also at the same time manifold 8 may feed fluid directly to filter unit No. 3 and from the latter to filter unit No. 4 discharging, also, into pipe 25. In addition as a further example of operation, at the same time as that of the foregoing, manifold 8 may feed fluid to filter unit No. 6, and thence to pipe 25.

The system, exemplified by the embodiment apparatus provides two-stage filtration when desired, with the flow divided at the discharge from an initial filter unit, and so as to flow simultaneously into two filter units, and thence to discharge if desired. Thus, the flow of fluid to be treated may be from manifold 1 to filter No. 1, thence simultaneously to filters 2 and 3, and from the latter to discharge, All of the filters of the group may be employed in such general arrangement. Thus manifold may discharge into filter unit No. 4 and then from the latter simultaneously into filters 5 and 6, and thence to discharge. In a further arrangement, of three stage filtration, manifold 8 may discharge simultaneously into filter units No. 1 and No. 4, and filter No. 1 can be regulated to feed simultaneously into filter unit No. 2 and from the latter into filter No. 3 by means of valve 28, whereas filter No. 4 can feed into filter No. 5 and from the latter into filter No. 6 by menas of valve 29. In such arrangement the discharge from the filter units will be by filters 2 and 3, and 5 and 6. When a cycle of filtering action has been terminated and the recovered treated fluid drawn off, the remaining fluid may be discharged from the operated filter units by means of the appropriate pipe or pipes 23 leading to draw-off pipe 25.

Means are provided for cleaning the filtering media by back-washing any one of the filter units selectively and for that purpose 3-way valves $9^x$ to $14^x$ inclusive lead the backwashflow from pipe 25 to the appropriate filter unit via the appropriate pipe 23 and therefrom through the appropriate pipe of the group 9 to 13, and 21, inclusive, thence through manifold 15 ro the separator and concentrator. These operations may be with the additional force of pressurized air or steam.

As shown in FIG. 2. each filter unit (unit No. 2 being shown as an example) will be provided with closures resistant to pressure and covering openings through which filter media, etc. can be passed and spent material withdrawn. The filter material zone is indicated by the character Z.

It will be understood that various modifications may be made in the form and arrangement of the elements shown in the illustrated embodiment, within the spirit of the claims.

We claim:

1. A selective multi-stage filtration system comprising a plurality of filter units, fluid feeding means including a first manifold, a first series of branch pipes leading from said manifold to each of the filter units, a second manifold and a second series of branch pipes leading therefrom to each of the filter units, valves controlling each of the first series of branch pipes, valves controlling each of the second series of branch pipes, said manifolds, branch pipes and valves being controllable to pass a fluid, fed into the system, selectively through one or a plurality of the filter units succesively and to a point of discharge from the filter units, and whereby each filter unit may be operated at its own rate of flow therethrough, and may contain a filtering medium distinct from those of others of the filter units, a series of valve controlled discharge pipes leading from the filter units, a third manifold connected to said pipes for reception of treated fluid from said filter units, and a third series of branch pipes leading from said discharge pipes and having valve-controlled communication with said second manifold.

2. A selective multi-stage filtration system, constructed in accordance with claim 1 in combination with an initial receiving chamber for fluids to be treated and constituting a charging-fluid interceptor, a terminating chamber constituting a fluid separator and concentrator, valve control means for fluid flow connecting the first manifold and the charging-fluid interceptor, and valve controlled means connecting the charging-fluid interceptor and fluid separator and concentrator.

3. A selective multi-stage filtration system, constructed in accordance with claim 2, in combination with means for carrying heavier fluids from stratas of relatively heavy and lighter fluids from the fluid separator and concentrator back to the fluid interceptor for recycling through one or more of the filter units.

* * * * *